W. REDMOND.
Cut-Off for Steam-Engines.
No. 225,866. Patented Mar. 23, 1880.
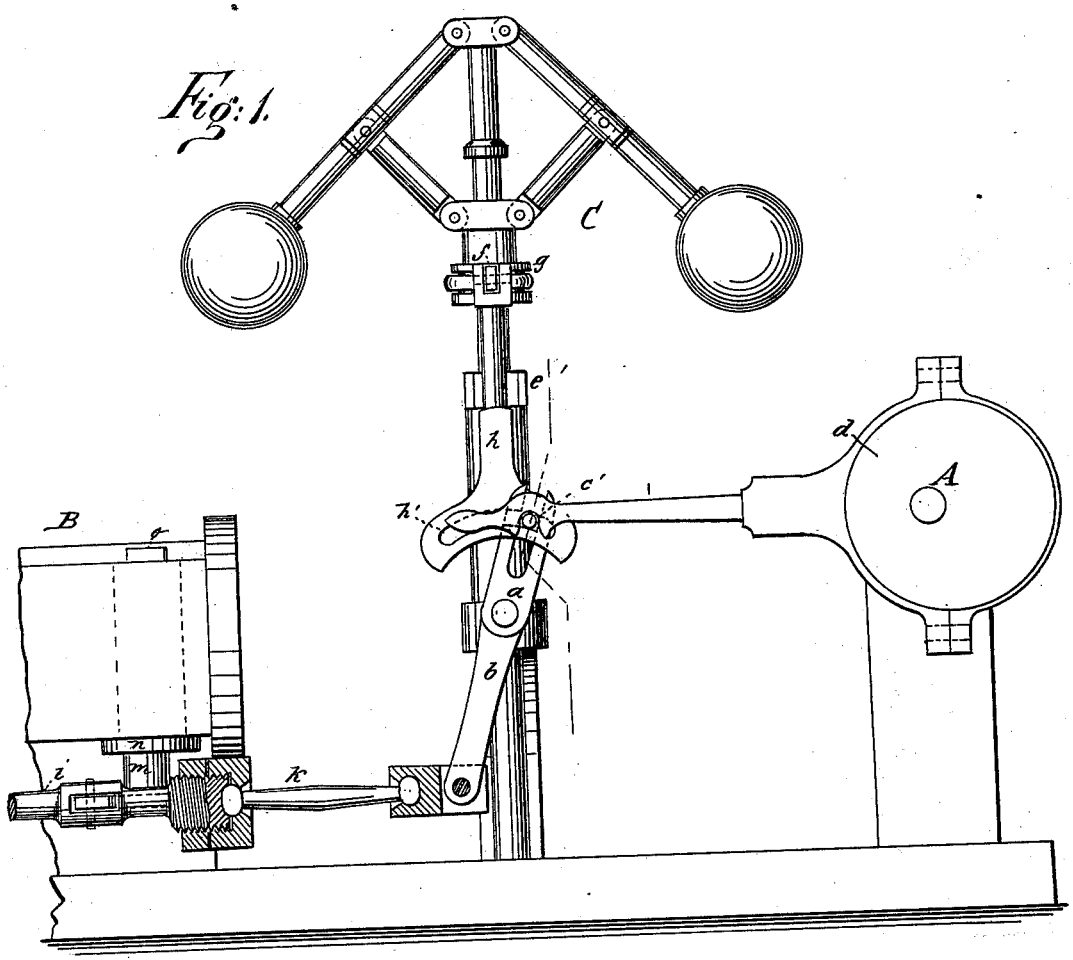
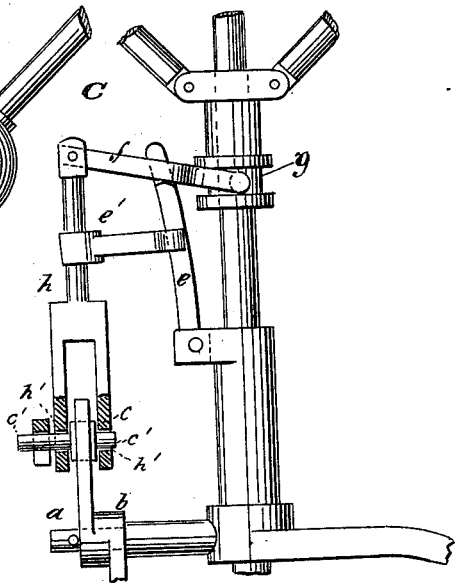
WITNESSES:
Chas. Nira.
C. Sedgwick
INVENTOR:
W. Redmond
BY Munn & Co.
ATTORNEYS.

UNITED STATES PATENT OFFICE.

WILLIAM REDMOND, OF GREENVILLE, SOUTH CAROLINA.

CUT-OFF FOR STEAM-ENGINES.

SPECIFICATION forming part of Letters Patent No. 225,866, dated March 23, 1880.

Application filed July 12, 1879.

*To all whom it may concern:*

Be it known that I, WILLIAM REDMOND, of Greenville, in the county of Greenville and State of South Carolina, have invented a new and Improved Cut-Off for Steam-Engines, of which the following is a specification.

My improvements relate to automatic cut-off mechanism for steam-engines operated by an eccentric on the crank-shaft of the engine. I make use of a rocking lever connected with the valves and with the eccentric-rod. The connection with the eccentric-rod is made by a block that is fitted for movement in the rocking lever to and from the fulcrum thereof, and is positioned by connections from a speed-governor, so that as the governor-balls rise a quicker movement is given to the valves, and the reverse as the balls fall. These features I will describe more particularly in connection with the accompanying drawings, wherein—

Figure 1 is a side elevation of the cut-off mechanism as fitted in connection with the crank-shaft and cylinder of an engine. Fig. 2 is a sectional elevation at right angles to Fig. 1, showing the connections with the governor.

Similar letters of reference indicate corresponding parts.

A is the crank-shaft, and B the valve-chest and cylinder, of an engine. Upon a fixed fulcrum, $a$, is hung a lever, $b$, one end of which is connected with the valves, as hereinafter described, and the other end is slotted to receive a slide or block, $c$, which is formed with trunnions $c'$ and connected to the rod of the eccentric $d$, which is upon the shaft A.

C is a ball-governor, of any usual character, and driven by suitable connections. Upon the support of the governor-spindle is pivoted an arm, $e$, that stands nearly vertical, and forms the support of an arm or lever, $f$, the inner end of which is connected to the sliding sleeve $g$ of the governor. From the outer end of the arm $f$ is hung a forked link-piece, $h$, which is formed with curved slots $h'$ at its forked end to receive the trunnions $c'$ of the block $c$, whereby the block $c$ is sustained in the slot of lever $b$, and the vibrations of lever $b$ are permitted by the slot $h'$. The arm $e$ is formed with a slotted guide, $e'$, which rests upon and guides the link $h$.

In operation, as the balls are thrown out and sleeve $g$ rises the block $c$ is, by the medium of arm $f$ and link $h$, moved downward in the slot of lever $b$, thereby causing a quicker action of the eccentric upon the valves and cutting off the steam sooner. As the balls fall the reverse action takes place, the valves are moved more slowly, and cut off nearer the end of the stroke. The valves are moved by a rod, $i$, that is connected to lever $b$ by a rod, $k$. This rod $k$ is connected to both $i$ and $b$ by a ball-joint, as shown, so that the curved movement of lever $b$ is accommodated to the straight-line movement of rod $i$.

By the above-described mechanism the steam will be cut off at variable points, regulated by the speed, and sudden increase or decrease of of speed checked.

Having thus described my invention, what I claim as new, and desire to secure by Letters Patent, is—

1. The combination, with the governor and cut-off mechanism, of the sleeve $g$, block $c$, arm $f$, slotted link $h$, and slotted lever $b$, as and for the purpose specified.

2. The combination, with the governor, sleeve $g$, block $c$, arm $f$, slotted link $h$, and slotted lever $b$, of the rod $i$, connected with the cut-off lever $b$ by a rod, $k$, having a ball-and-socket joint at each end, with the valve-stems $m$, flattened on two sides, passing through box $n$, and carrying an arm connected with rod $i$, as and for the purpose specified.

WILLIAM REDMOND.

Witnesses:
C. H. LARMEAN,
L. B. SANFORD.